(12) United States Patent
Kim et al.

(10) Patent No.: US 10,371,794 B2
(45) Date of Patent: Aug. 6, 2019

(54) UNMANNED AERIAL VEHICLE WITH DEPLOYABLE TRANSMIT/RECEIVE MODULE APPARATUS WITH RAMJET

(71) Applicant: The Boeing Company, Chicago, IL (US)

(72) Inventors: Inyoung Daniel Kim, St. Louis, MO (US); Ryan S. Wilson, Creve Coeur, MO (US)

(73) Assignee: The Boeing Company, Chicago, IL (US)

( * ) Notice: Subject to any disclaimer, the term of this patent is extended or adjusted under 35 U.S.C. 154(b) by 606 days.

(21) Appl. No.: 15/165,663

(22) Filed: May 26, 2016

(65) Prior Publication Data

US 2017/0343645 A1    Nov. 30, 2017

(51) Int. Cl.
*B64C 29/00* (2006.01)
*G01S 7/02* (2006.01)
(Continued)

(52) U.S. Cl.
CPC .............. *G01S 7/021* (2013.01); *B64C 3/38* (2013.01); *B64C 30/00* (2013.01); *B64C 39/024* (2013.01); *B64D 5/00* (2013.01); *F02K 7/10* (2013.01); *F42B 10/48* (2013.01); *G01S 7/003* (2013.01); *G01S 13/003* (2013.01); *G01S 13/87* (2013.01); *G05D 1/0011* (2013.01); *G05D 1/0088* (2013.01); *H01Q 1/287* (2013.01); *B64C 2201/021* (2013.01); *B64C 2201/082* (2013.01); *B64C 2201/12* (2013.01); *B64C 2201/167* (2013.01); *F05D 2220/10* (2013.01)

(58) Field of Classification Search
USPC .................... 701/2, 3, 4, 14, 15, 23, 470
See application file for complete search history.

(56) References Cited

U.S. PATENT DOCUMENTS 5,728,965 A * 3/1998 Fesland ............... B64C 39/024
                                                        244/190
6,056,237 A * 5/2000 Woodland ............ B64C 3/40
                                                        244/120
(Continued)

FOREIGN PATENT DOCUMENTS

JP      H05341042 A     12/1993
WO     2008010226 A1     1/2008

*Primary Examiner* — Richard A Goldman
(74) *Attorney, Agent, or Firm* — Felix L. Fischer

(57) ABSTRACT

A system for bistatic radar target detection employs an unmanned aerial vehicle (UAV) having a ramjet providing supersonic cruise of the UAV. Deployable antenna arms support a passive radar receiver for bistatic reception of reflected radar pulses. The UAV operates with a UAV flight profile in airspace beyond a radar range limit. The deployable antenna arms have a first retracted position for supersonic cruise and are adapted for deployment to a second extended position acting as an airbrake and providing boresight alignment of the radar receiver. A mothership aircraft has a radar transmitter for transmitting radar pulses and operates with an aircraft flight profile outside the radar range limit. A communications data link operably interconnects the UAV and the tactical mothership aircraft, transmitting data produced by the bistatic reception of reflected radar pulses in the UAV radar antenna to the mothership aircraft.

20 Claims, 6 Drawing Sheets

(51) Int. Cl.
*B64C 30/00* (2006.01)
*B64C 39/02* (2006.01)
*B64D 5/00* (2006.01)
*F02K 7/10* (2006.01)
*G01S 7/00* (2006.01)
*G05D 1/00* (2006.01)
*B64C 3/38* (2006.01)
*F42B 10/48* (2006.01)
*G01S 13/00* (2006.01)
*G01S 13/87* (2006.01)
*H01Q 1/28* (2006.01)

(56) References Cited

U.S. PATENT DOCUMENTS

| | | | | |
|---|---|---|---|---|
| 6,257,527 B1 * | 7/2001 | Redding, Jr. | | B64G 1/12 |
| | | | | 244/159.1 |
| 6,564,146 B1 * | 5/2003 | Meyer | | F41G 7/001 |
| | | | | 244/3.14 |
| 6,653,970 B1 * | 11/2003 | Mitra | | G01S 13/003 |
| | | | | 342/191 |
| 6,718,261 B2 * | 4/2004 | Mattheyses | | G01C 21/00 |
| | | | | 342/26 R |
| 7,032,858 B2 * | 4/2006 | Williams | | G01S 13/89 |
| | | | | 244/3.1 |
| 7,642,953 B2 * | 1/2010 | Cheng | | G01S 7/003 |
| | | | | 342/179 |
| 8,570,210 B1 | 10/2013 | Fonder | | |
| 8,639,396 B1 * | 1/2014 | Hirsch | | G08G 5/0008 |
| | | | | 244/76 R |
| 9,356,347 B2 * | 5/2016 | Nishikata | | H01Q 3/34 |
| 2008/0125920 A1 * | 5/2008 | Miles | | B64C 39/024 |
| | | | | 701/2 |
| 2009/0021423 A1 * | 1/2009 | Cheng | | G01S 7/003 |
| | | | | 342/25 A |
| 2010/0023206 A1 * | 1/2010 | Paquette | | H04L 67/12 |
| | | | | 701/33.4 |
| 2010/0123042 A1 * | 5/2010 | Ballard | | B64C 39/024 |
| | | | | 244/118.1 |
| 2015/0237569 A1 * | 8/2015 | Jalali | | H04W 84/06 |
| | | | | 370/326 |
| 2016/0076892 A1 * | 3/2016 | Zhou | | B64C 39/024 |
| | | | | 701/3 |
| 2017/0057635 A1 * | 3/2017 | Strayer | | B64C 39/024 |
| 2017/0201313 A1 * | 7/2017 | Chang | | H04B 7/18502 |
| 2017/0222712 A1 * | 8/2017 | Chang | | H04W 4/90 |
| 2017/0343645 A1 * | 11/2017 | Kim | | B64C 30/00 |
| 2018/0072413 A1 * | 3/2018 | Moshe | | B64C 27/22 |
| 2018/0088578 A1 * | 3/2018 | Burch, V | | G05D 1/0088 |

\* cited by examiner

UNMANNED AERIAL VEHICLE WITH DEPLOYABLE TRANSMIT/RECEIVE MODULE APPARATUS WITH RAMJET

BACKGROUND INFORMATION

Field

Embodiments of the disclosure relate generally to bistatic tactical radar applications employing supersonic unmanned aerial vehicles and more particularly to a system employing small unmanned air vehicles (UAV) having transmit/receive antennae deployable from a retracted supersonic cruise position to an extended triangular form.

Background

Aircraft reconnaissance and interdiction has been significantly complicated by the appearance of highly accurate and often minimally detectable antiaircraft systems. Consequently, most current tactical combat aircraft entering into contested or hostile airspace are placed at risk. The detection range of these systems may be significant thus requiring a significant standoff distance to avoid the contested airspace, often beyond the effective range of radar systems employed in current tactical aircraft. The use of stealth aircraft to penetrate hostile airspace and accomplish such missions provides a certain level of increased survivability but such aircraft are highly expensive assets and are used only upon critical need. Use of UAVs for bistatic radar applications provides an alternative. However, speed of typical UAV system requires significant standoff time for aircraft acting as a mothership for deployment.

It is therefore desirable to provide a system with a high speed UAV component for bistatic radar sensing whereby a mothership may remain clear of contested airspace while being able to use radar surveillance for target identification, acquisition and establishing prosecutable trackfiles.

SUMMARY

Exemplary embodiments provide a system for bistatic radar target detection employing an unmanned aerial vehicle (UAV) having a ramjet providing supersonic cruise of the UAV. Deployable antenna arms support a passive radar receiver for bistatic reception of reflected radar pulses. The UAV operates with a UAV flight profile in airspace beyond a radar range limit. The deployable antenna arms have a first retracted position for supersonic cruise and are adapted for deployment to a second extended position acting as an airbrake and providing boresight alignment of the radar receiver. A mothership aircraft has a radar transmitter for transmitting radar pulses and operates with an aircraft flight profile outside the radar range limit. A communications data link operably interconnects the UAV and the tactical mothership aircraft, transmitting data produced by the bistatic reception of reflected radar pulses in the UAV radar antenna to the mothership aircraft.

The embodiments disclosed provide a method for bistatic radar target detection where a UAV is launched and navigated with a ramjet engine at supersonic cruise to beyond a radar range limit. A mothership aircraft is maintained on a flight profile outside the radar range limit. Antenna arms are extended to act as air brakes reducing speed and providing boresight orientation of Tx/Rx modules for bistatic radio frequency (RF) pulse reception. A high power radar system on the mothership aircraft is employed to emit radar pulses and receive (Rx) modules on the UAV are employed as a bistatic receiver to receive reflected radar pulses from targets. Target data from the UAV is then transmitted via a communications data link to the mothership aircraft.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

Current bistatic radar systems employing UAVs provide nose mounted or side mounted antenna with conventional propulsion. This reduces bi-static sensor performance as well as the overall speed of the UAV. The system and methods described herein provide embodiments which solves these problems by employing a ramjet in a UAV with deployable side mounted antennas. The ramjet greatly increases the instantaneous acceleration and top speed of the UAV for ingress into and egress from the target area. The front section of the UAV is replaced with a ramjet inlet, instead of the sensor suites. The Transmit/Receive modules (T/R Modules) of the Active Electronically Scanned Array (AESA) antenna are mounted on the sides of the UAV in multiple panels. These T/R modules are installed with forward tilted positions so that when the panels deploy the planar face of the T/R modules all face forward directly towards the direction of motion, reducing the need for beam steering and thus increasing the antenna performance. The deployed antenna panels also are employed as air brakes to reduce the velocity of the UAV. Deployment occurs in conjunction of decreasing air intake to the ramjet. In operational concept, when a host aircraft will carry a UAV of the current embodiment and upon a need to increase sensor range on short notice, the host aircraft will launch the bi-static UAV with ramjet. The UAV will transition to the area of interest quickly using ramjet power. Once in the target area, the thrust of the ramjet will be reduced and the antenna panels will deploy, to collect the radar return from a target illuminated by radar on the host aircraft. Deployment of the antenna panels will assist in speed reduction of the UAV to maximize sensor collection time.

Figure 1:
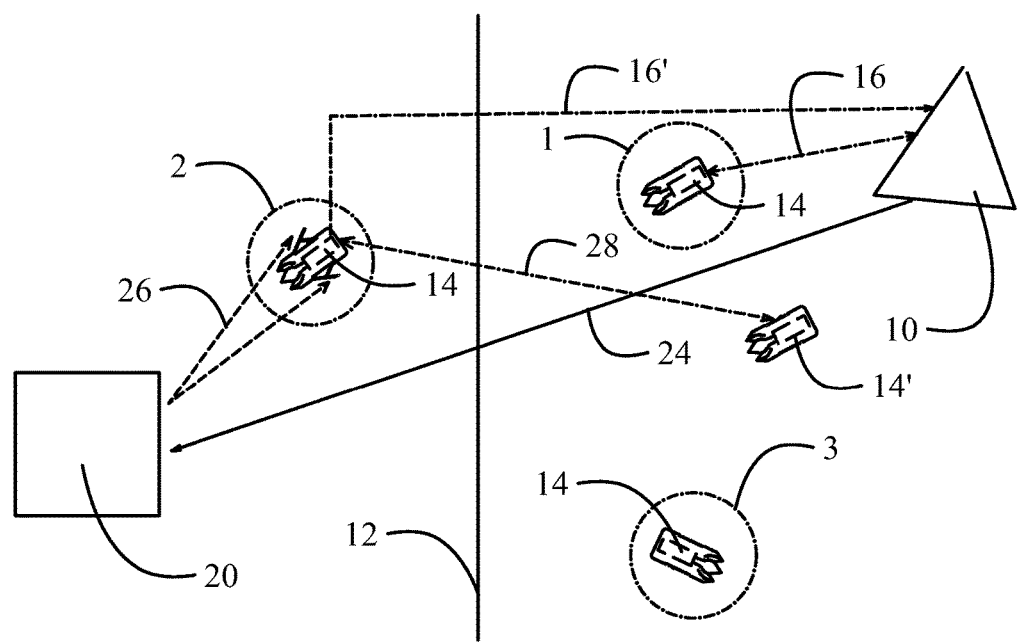
FIG. 1 is a block diagram of the operational elements and deployment scenario for embodiments as disclosed herein.
Figure 2A:
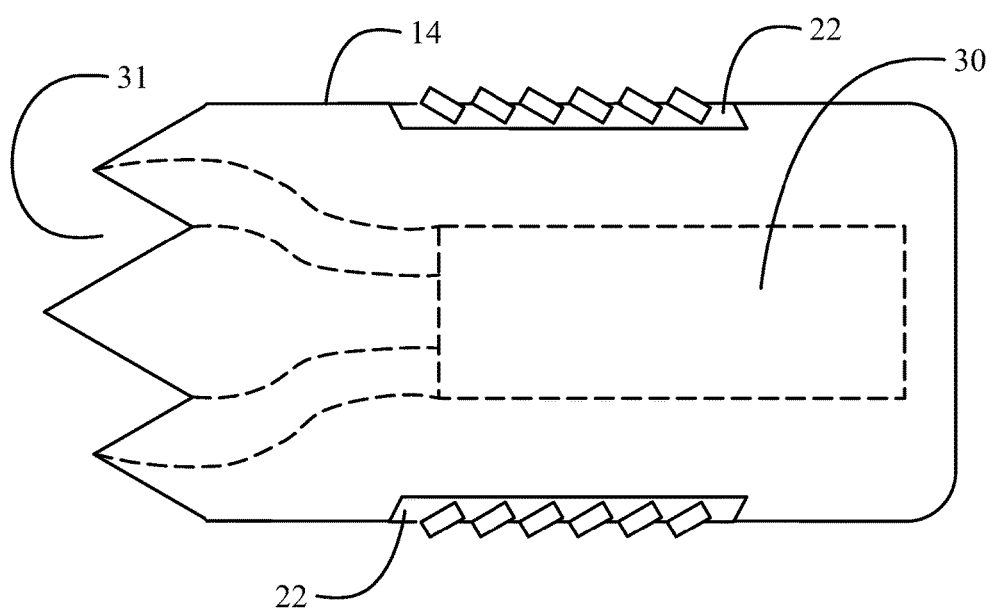
FIG. 2A is a top view representation of an embodiment of the UAV with deployable transmit/receive module apparatus and ramjet with antennae in the retracted position for cruise.
Figure 2B:
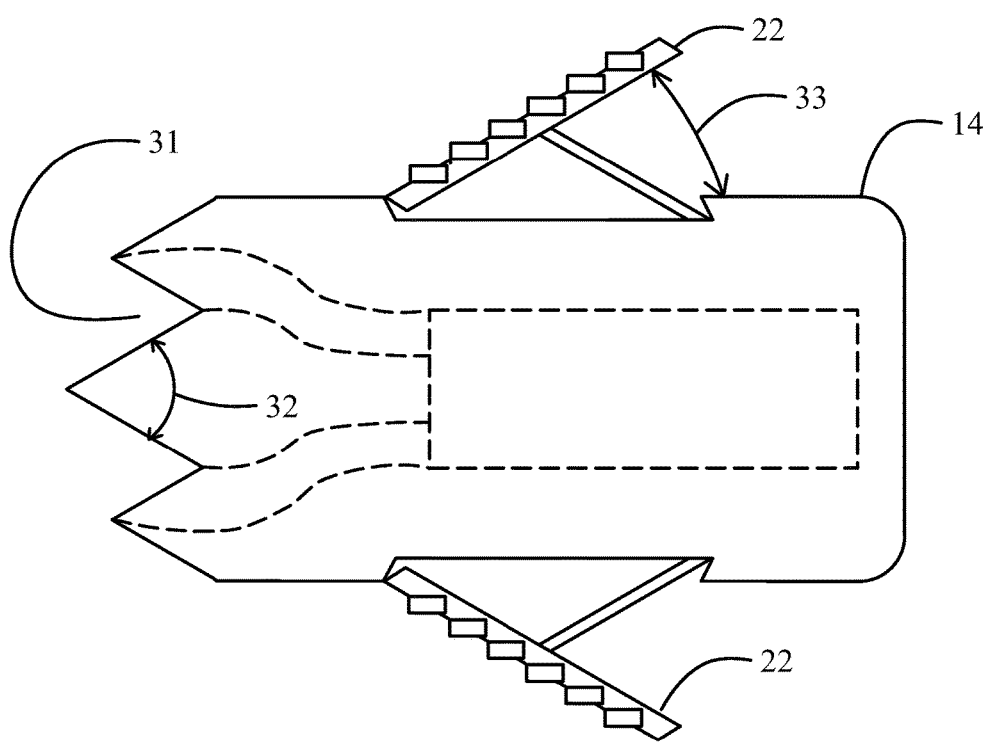
FIG. 2B is a representation of the embodiment of FIG. 2A with the antennae in the deployed position for skin return reception and air braking capability.

Referring to the drawings, FIG. 1 shows a mothership aircraft 10 with a radar range limit 12. The radar system of the mothership aircraft 10 provides radar pulse power effective to a distance L while detection capability of the radar will be nominally L/2. The radar range limit 12 is defined as the detection range, L/2. To extend the effective radar range, a UAV 14 is launched from the mothership aircraft 10. After launch the UAV 14 is navigated, either autonomously with downloaded mission profile information or directly by aircrew in the mothership aircraft 10 or a remote land or sea based control station. Transmissions 16 from a C2 communication link, to be described in greater detail subsequently, are employed for communication between the mothership aircraft 10 and the UAV 14. While in transit between the mothership aircraft 10 and a target 20 (position 1) a ramjet 18 (to be described in greater detail with respect to FIG. 2A) is engaged to provide sustained supersonic cruise for the UAV 14. The target 20 is beyond the radar range limit 12 from the mothership aircraft 10. As the UAV 14 travels on a flight profile beyond the radar range limit 12 and approaches the suspected target 20 (at position 2), antenna arms 22 are deployed (as shown in FIG. 2). Deployment of the antenna arms 22 provides an airbrake to reduce the velocity of the UAV and, as will be described in greater detail subsequently, positions transmit (Tx)/Receive (Rx) modules for optimum geometry with respect to the target 20. While the flight profile of the mothership aircraft 10 remains outside the radar range limit with respect to the target 20 as shown in FIG. 1, radar illumination of the target 20 by the radar in the mothership aircraft, radar pulses represented by arrows 24, creates radar reflections from the target known in the art as "skin returns", as RF pulses represented by arrows 26. These skin returns are bistatically received by the Rx modules in the UAV 14. Sensor data from the Rx modules is transmitted over the communication link represented by trace 16', to the mothership aircraft 10 thereby extending the effective detection range of the radar on the mothership aircraft. The target 20 may be an air-to-air (A/A) target or and air-to-ground (A/G) target. Upon completion of the desired mission profile the UAV 14 egresses from the target area (position 3) and may be recovered or destroyed as will be described subsequently. In certain applications a drone-to-drone communication link, represented by arrow 28 may be employed for communications between a second launched UAV 14' and a first launched UAV 14 for navigation information to an identified target or other tactical information As shown in FIG. 2A, the UAV 14 incorporates a ramjet 30 having a supersonic inlet with intakes 31. Antenna arms 22 are carried in a retracted position substantially flush with the side profile of the UAV 14. As seen in FIG. 2B, upon deployment, the antenna arms 22 are carried at an extension angle 33 no greater than the tilt angle 32 of the inlet intakes 31 to maintain a substantially triangular form for aerodynamic considerations in reducing shockwave when transitioning from supersonic to subsonic speed and for maintaining a desired radar cross section (RCS). Deployment of the antenna arms 22 provides aerodynamic braking to slow the UAV 14 to a desired airspeed nominally not less than 0.5 Mach. In an exemplary embodiment the triangular form of the UAV has a nose angle of 60°, substantially identical to the tilt angle 32 providing an extension angle of 30° or less.

Figure 3:
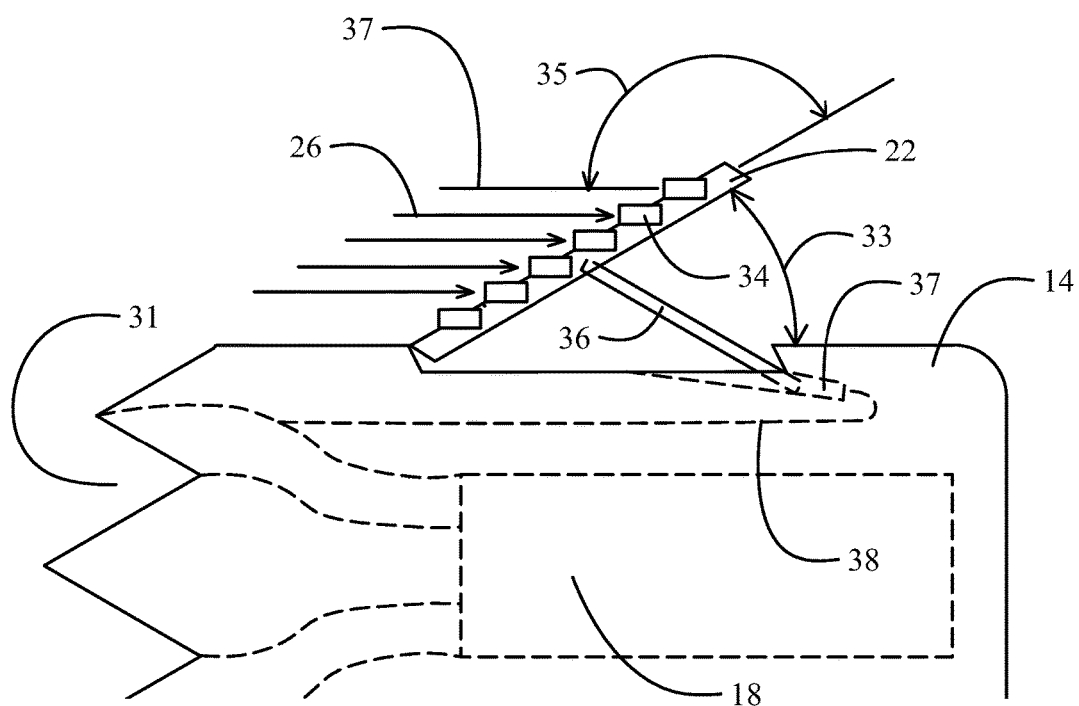
FIG. 3 is a representation of details of the transmit/receive modules attachment to the antenna backplane and the antenna deployment mechanism.

Details of the antenna system are shown in FIG. 3. Tx/Rx modules 34 are mounted to the antenna arms 22 with a bias angle 35 complementary to extension angle 33 whereby the boresight 37of the Tx/Rx modules is substantially aligned with the direction of flight of the UAV 14 for incoming RF pulses 26 from the target. The antenna arms 22 provide a backplane acting as a RF corporate feed (a common feed network interconnecting input and output signals of the multiple Tx/Rx modules) to the Tx/Rx modules 34 which may be air or liquid cooled. A deployment rod 36 pivotally actuates each antenna arm 22 and the deployment rod and antenna arm may both incorporate waveguide or coax for interconnection to a UAV radar system to be described subsequently and, if the Tx/Rx modules are liquid cooled, appropriate coolant piping. The Tx/Rx modules 34 may be covered with a radome (not shown) for aerodynamic smoothness. The deployment rod 36 may be carried in a pressure cylinder 37 allowing actuation of the deployment rod by pressure feed from a bypass conduit 38 from the inlet intake 31. In certain embodiments, the antenna arms may be deployed at selectable angles other than the extension angle between the retracted position and a critical angle position where the drag caused by the antenna arms reduces the airspeed of the UAV to a point wherein the UAV is unable to maintain flight above stall speed. At deployed positions between the stowed position and a critical angle position the panels may be used as a brake. Specifically, if the panels are positioned at a smaller angle, less braking is obtained, at higher angles then more braking will be achieved.

Figure 4:
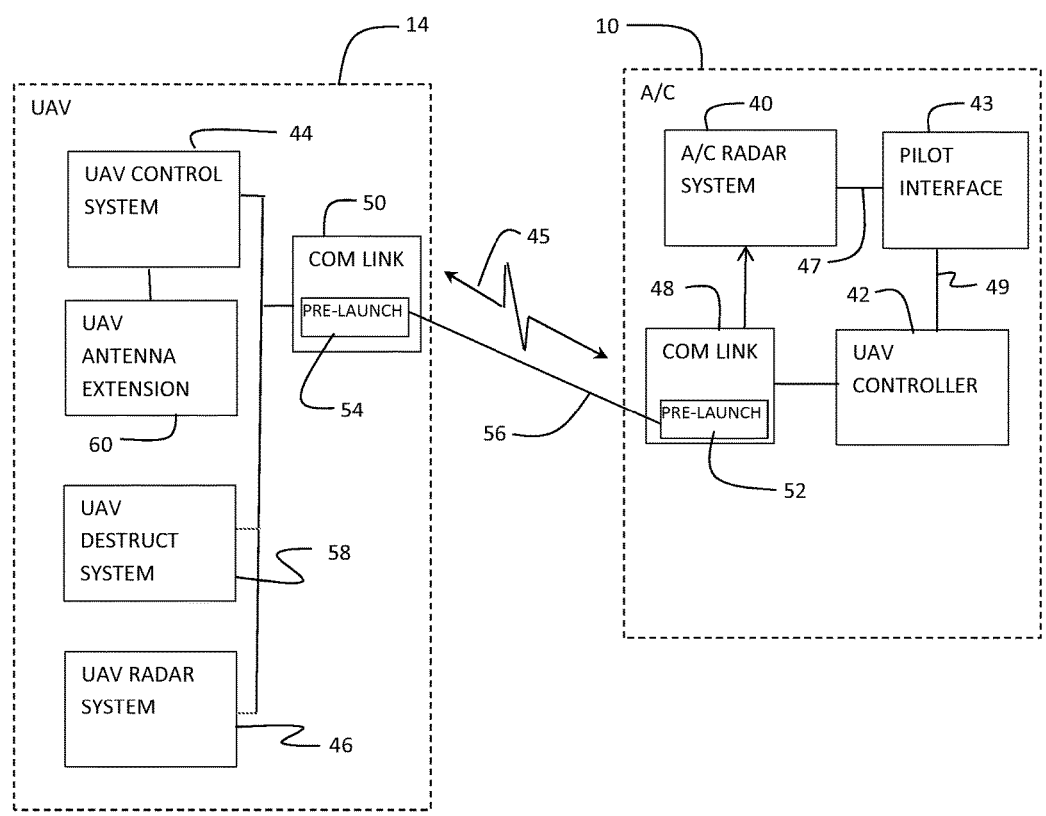
FIG. 4 is a block diagram of system components in the mothership aircraft and UAV; and, FIG. 5 is a flow chart of a method for implementing the disclosed embodiments.

The system components incorporated in the UAV 14 and mothership aircraft 10 are shown in FIG. 4. The mothership aircraft 10 incorporates a high power transmit and receive radar system 40 and a UAV controller 42. A mission management system/pilot vehicle interface system 43, integral to the mothership aircraft and adapted for interface to a crewmember on the mothership aircraft, provides interface control for the radar system 40 and the UAV controller 42. The UAV controller may be operated by a crewmember on the mothership aircraft 10 for direct control of the UAV flight profile and UAV radar system. The UAV 14 incorporates a UAV control system 44 which controls the flight profile of the UAV. UAV radar system 46 incorporates the deployable radar antenna arms 22 with the Tx/Rx modules 34 as described in FIG. 3 as well as a data processing system for receiving and processing bistatic radar signals. Typically the Tx/Rx modules will operate in receive mode only as Rx modules for acquisition of bistatic signals generated from the mothership aircraft radar. However, in certain applications, the UAV radar system 46 will include transmitting capability to supplement the radar transmission from the mothership aircraft 10. A communications data link 48 in the mothership aircraft 10 and a mating communications data link 50 in the UAV 14 are operably connected to provide communications between the mothership aircraft and the UAV. Data from the communications data link 48 to the mission management and pilot vehicle interface system 43 represented by arrow 45 provides bistatic radar information from the UAV radar system 46 and data regarding the UAV position and flight profile from the UAV control system 44 to the mission management and pilot vehicle interface system 43 for display. Radar commands 47 from the mission management and pilot vehicle interface system 43 to the aircraft radar system 40 provide commands to the radar to directionally control the radar beam to the intended target. UAV commands 49 from the mission management and pilot vehicle interface system 43 to the UAV controller 42 provide input through the communications data link 48 to command the UAV to fly/orbit/loiter in a desired flight profile. In the exemplary embodiment, an L-band (1 to 2 GHz) data link for line of sight bidirectional communication is employed. The UAV may remain primarily in a receive only mode. The data link will contain messages which will be used to direct and control the UAV's flight control system 44 as well as the radar system 46, as needed. The UAV will use the data link to report its location and current air vehicle status back to the host mothership aircraft as well as transmission of data from the radar system 46. The communications data links 48, 50 may employ data burst or beam agility capability for covert operation. The communications data links 48, 50 may also employ pre-launch communications elements 52, 54 "hardwire" connected through Ethernet or fiber optic ports 56 for pre-launch communication between the mothership aircraft 10 and UAV 14.

In the airspace beyond the radar range limit 12 of the mothership aircraft 10, UAV 14 provides a passive bistatic receiver for the reflected skin returns 26 from a target 20 by impinging radar pulses 24 emitted by the radar of the mothership aircraft 10, which may remain in uncontested airspace. In the exemplary embodiments, the UAV 14 Tx/RX modules on the antenna arms will operate mothership aircraft 10 which will be carrying the transmit/receive radar. The mothership aircraft 10 has the capability to carry a radar system with power output of orders of magnitude of 10 or higher than that of the UAV 14 and thus is it possible for the mothership aircraft to stay in standoff range and radiate while remaining clear out of harm's way while UAV may need to stay "radio silence" to maintain its low observable nature. Passive operation enhances the ability of the location of the UAV 14 to be masked from hostile radar detection systems. Data characterizing target(s) 20 from the bistatically received radar data is then transmitted by the UAV 14 to the mothership aircraft 10 by datalink transmission 38.

Accordingly, the UAV is not tethered, but rather the UAV is releasably coupled to an existing pylon on the mothership aircraft (or other mounting structure) in a manner such that the UAV may be deployed from and guided by the UAV controller in the mothership aircraft towards a target beyond the radar range detection limit for the mothership aircraft, to thereby increase the target detection range such that the mothership aircraft can stay out of contested airspace while collecting radar data on a target that would otherwise be out of range.

As described with respect to FIG. 1, the UAV 14 may be retrieved via a low impact landing after a flight profile to a friendly area for recovery or the UAV will carry a destruct system 58 with explosives for self-destruction purposes on vital communication and radar subsystems in the UAV. The destruct system 58 may be activated, either as a portion of the flight profile or upon loss of data link communications, through the UAV control system 44, or upon instruction from mission management and pilot vehicle interface system 43 through the UAV controller 42 on the mothership aircraft 10 transmitted using communications data links 48, 50.

As a portion of the UAV control system 44, or connected thereto, an antenna extension system 60 is incorporated to control the extension of the antenna arms 22. Upon command by the UAV controller in the mothership aircraft through the com link and UAV control system or autonomously by the UAV control system when speed reduction of the UAV from supersonic cruise for target acquisition mode, the antenna extension system activates the deployment rods 36 and the antenna arms are extended to the extension angle 33.

Figure 5:
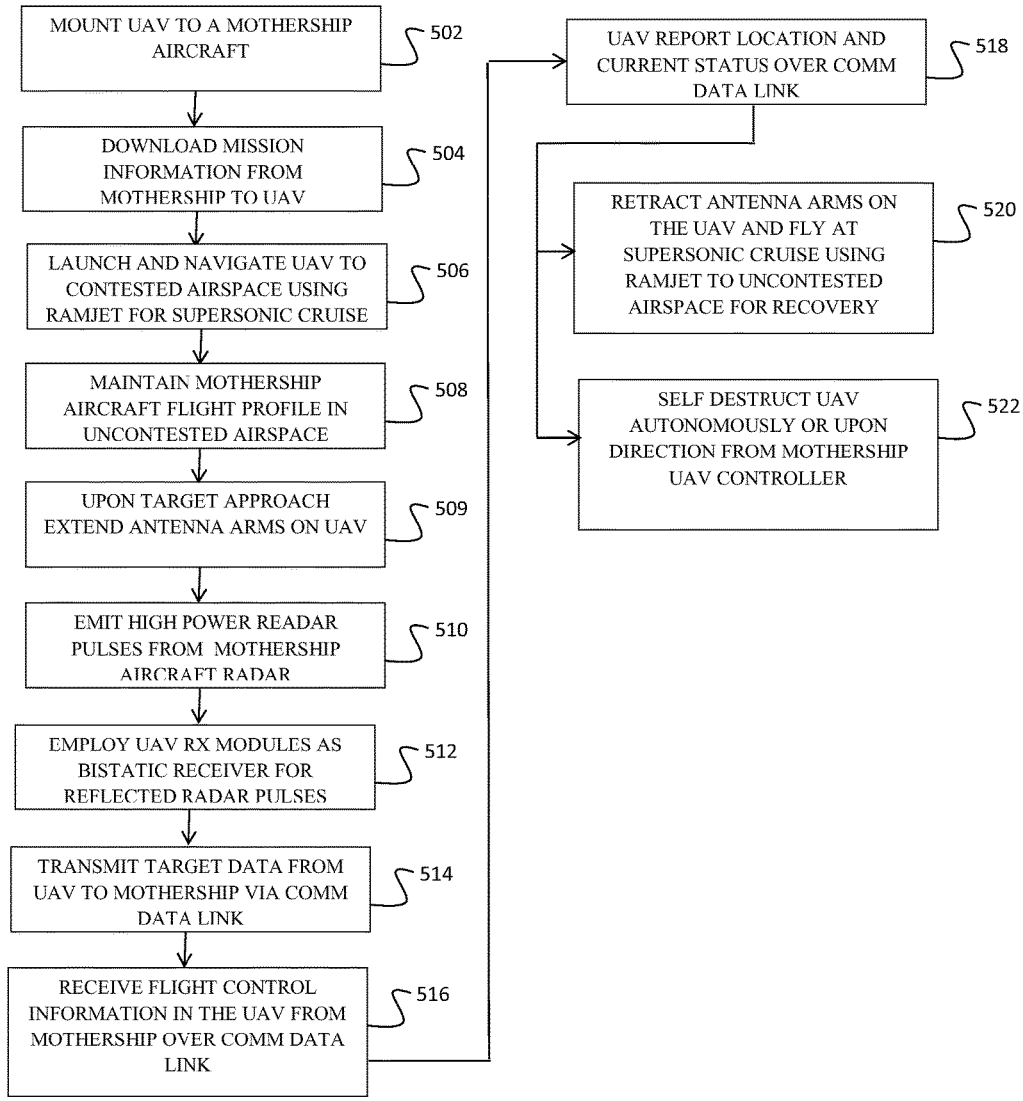

The embodiments disclosed herein allow a method of target detection as shown in FIG. 5. A UAV is mounted to a mothership aircraft, step 502, and mission information, potentially including an autonomous flight profile, may be downloaded from the mothership aircraft to the UAV, step 504. The UAV is launched and navigated into contested airspace using the ramjet engine for supersonic cruise, step 506, while the mothership aircraft maintains a flight profile outside a radar range limit in uncontested airspace, step 508. Upon target approach, antenna arms on the UAV are extended, step 509, to act as air brakes reducing speed and providing boresight orientation of Tx/Rx modules for bistatic RF pulse reception. The mothership aircraft employs a high power radar system to emit radar pulses, step 510, and the UAV employs the Rx/Tx modules as a bistatic receiver to receive reflected radar pulses from targets, step 512. The UAV then transmits target data via a communications data link to the mothership aircraft, step 514. The UAV may additionally receive flight control information from the mothership aircraft over the communications data link, step 516, and may report its location and current status, step 518. Upon completion of the mission profile, the UAV may retract the antenna arms and fly at supersonic cruise employing the ramjet engine to uncontested airspace and be recovered through a soft landing or other known recovery techniques, step 520. Alternatively, the UAV may self-destruct either autonomously through commands from the UAV control system or upon direction from the UAV controller on the mothership aircraft, step 522. While described herein as launched from the mothership aircraft, the UAV may be conventionally launched from other ground or airborne assets for the desired flight profile into contested airspace achieving data link communication with the mothership aircraft when both have established their respective flight profiles.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. A system for bistatic radar target detection comprising:
   a mothership aircraft having a radar transmitter for transmitting radar pulses, said mothership aircraft operating with an aircraft flight profile outside a radar range limit with respect to a target;
   an unmanned aerial vehicle (UAV) having
      a ramjet providing supersonic cruise of the UAV, and
      deployable antenna arms supporting a passive radar antenna having a plurality of receive (Rx) modules for bistatic reception of reflected radar pulses, said UAV operating with a UAV flight profile in airspace beyond the radar range limit relative to the target, said deployable antenna arms having a first retracted position for supersonic cruise and adapted for deployment to a second extended position, said second extended position acting as an airbrake and providing boresight alignment of the Rx modules; and,
   a communications data link operably interconnecting the UAV and the tactical mothership aircraft, said communications data link transmitting data produced by the bistatic reception of reflected radar pulses in the UAV radar antenna to the mothership aircraft.

2. The system for bistatic radar target detection as defined in claim 1 further comprising a UAV controller in the mothership aircraft, said UAV controller operably connected to the communications data link and transmitting flight control information to a UAV flight control system to control the UAV flight profile.

3. The system for bistatic radar target detection as defined in claim 1 wherein the antenna arms deployed to the second position maintain an extension angle not greater than the tilt angle of an inlet intake of the ramjet engine.

4. The system for bistatic radar target detection as defined in claim 1 wherein the passive radar receiver comprises a plurality of receive (Rx) modules attached to the antenna arms at an angle complimentary to the extension angle.

5. The system for bistatic radar target detection as defined in claim 3 wherein the antenna arms in the first retracted position are substantially flush with a side profile of the UAV.

6. The system for bistatic radar target detection as defined in claim 4 further comprising deployment rods pivotally connected to the antenna arms to deploy the antenna arms.

7. The system for bistatic radar target detection as defined in claim 6 wherein the deployment rods are carried in a pressure cylinder and activated by pneumatic pressure from a bypass duct connected to the inlet intake.

8. The system for bistatic radar target detection as defined in claim 2 further comprising a self-destruct system in the UAV.

9. The system for bistatic radar target detection as defined in claim 6 wherein the self-destruct system is operable by the UAV flight control system or the UAV controller.

10. A method for bistatic radar target detection comprising:
launching an unmanned aerial vehicle (UAV) having a ramjet providing supersonic cruise of the UAV and navigating the UAV with a UAV flight profile in airspace beyond a radar range limit relative to the target with the ramjet engine at supersonic cruise to beyond the radar range limit;
maintaining a mothership aircraft having a radar transmitter for transmitting radar pulses, said mothership aircraft operating with an aircraft flight profile outside the radar range limit;
extending deployable antenna arms supporting a passive radar antenna having a plurality of receive (Rx) modules for bistatic reception of reflected radar pulses and having a first retracted position for supersonic cruise and adapted for deployment to a second extended position, said second extended position acting as an airbrake and providing boresight alignment of the Rx modules to the second position to act as air brakes reducing speed and providing boresight orientation of Tx/Rx modules for bistatic RF pulse reception;
employing a radar transmitter on the mothership aircraft to transmit radar pulses;
employing the receive (Rx) modules on the UAV as a bistatic receiver to receive reflected radar pulses from targets; and,
transmitting target data from the UAV to the mothership aircraft via a communications data link operably interconnecting the UAV and the tactical mothership aircraft, said communications data link transmitting data produced by the bistatic reception of reflected radar pulses in the UAV passive radar antenna to the mothership aircraft.

11. The method as defined in claim 10 further comprising:
mounting the UAV to the mothership aircraft; and,
the step of launching the UAV comprises launching the UAV from the mothership aircraft.

12. The method as defined in claim 11 further comprising:
downloading mission information from the mothership aircraft to the UAV.

13. The method as defined in claim 12 wherein the mission information includes a flight profile for the UAV.

14. The method as defined in claim 11 further comprising:
receiving flight control information to the UAV from the mothership aircraft over the communications data link.

15. The method as defined in claim 11 further comprising:
reporting location and current status by the UAV over the communications data link.

16. The method as defined in claim 10 further comprising:
retracting the antenna arms and flying the UAV at supersonic cruise to uncontested airspace upon completion of the mission profile; and,
recovering the UAV through soft landing or other known recovery techniques.

17. The method as defined in claim 10 further comprising:
causing the UAV to self-destruct after completion of a mission profile.

18. The method as defined in claim 17 wherein the step of causing the UAV to self-destruct is autonomous through commands from the UAV control system.

19. The method as defined in claim 17 wherein the step of causing the UAV to self-destruct occurs upon direction from the UAV controller on the mothership aircraft.

20. An unmanned aerial vehicle (UAV) comprising:
a ramjet providing supersonic cruise of the UAV, and
deployable antenna arms supporting a passive radar antenna having a plurality of receiver (Rx) modules for bistatic reception of reflected radar pulses from a radar transmitter on a mothership aircraft, said mothership aircraft operating with a flight profile outside a radar range limit and said UAV operating with a UAV flight profile in airspace beyond the radar range limit, said deployable antenna arms having a first retracted position for supersonic cruise and adapted for deployment to a second extended position, said second extended position acting as an airbrake and providing boresight alignment of the Rx modules; and,
a communications data link operably interconnecting the UAV and the mothership aircraft, said communications data link transmitting data produced by the bistatic reception of reflected radar pulses in the UAV radar antenna to the mothership aircraft.

* * * * *